United States Patent
Obuhowich

(10) Patent No.: US 7,438,974 B2
(45) Date of Patent: Oct. 21, 2008

(54) PREMIXED AND FROZEN SEAL CAPS

(75) Inventor: George Obuhowich, Brampton (CA)

(73) Assignee: PPG Industries Ohio, Inc., Cleveland, OH (US)

( * ) Notice: Subject to any disclaimer, the term of this patent is extended or adjusted under 35 U.S.C. 154(b) by 1119 days.

(21) Appl. No.: 10/256,873

(22) Filed: Sep. 26, 2002

(65) Prior Publication Data
US 2003/0071421 A1   Apr. 17, 2003

Related U.S. Application Data

(60) Provisional application No. 60/326,391, filed on Sep. 28, 2001.

(51) Int. Cl.
B32B 7/12       (2006.01)
B32B 15/04      (2006.01)
E04B 1/682      (2006.01)
(52) U.S. Cl. .................... 428/346; 277/316; 411/377
(58) Field of Classification Search .............. 277/316; 411/377; 428/346
See application file for complete search history.

(56) References Cited

U.S. PATENT DOCUMENTS

| 3,470,787 A | 10/1969 | Mackie |
| 4,519,974 A | 5/1985 | Bravenec et al. |
| 4,826,380 A | 5/1989 | Henry |
| 5,755,908 A | 5/1998 | Rayburn et al. |
| 6,036,804 A | 3/2000 | Rayburn et al. |

FOREIGN PATENT DOCUMENTS

| EP | 0 325 222 B1 | 7/1989 |
| FR | 2 802 268 | 6/2001 |
| GB | 2 163 817 A | 3/1986 |
| JP | 54083077 A * | 7/1979 |

* cited by examiner

Primary Examiner—Michael C Miggins
(74) Attorney, Agent, or Firm—Diane R. Meyers

(57) ABSTRACT

A sealant, method for making the sealant, and method for applying the sealant includes a preformed at least partially hardened first quantity of sealant and a preformed at least partially unhardened second quantity of sealant. The first quantity of sealant is formed into a concave shell with an internal cavity. The second quantity of sealant is positioned within the internal cavity of the shell. The second quantity of sealant is maintained at a temperature sufficiently below the hardening temperature of the second sealant, such that said second sealant is at least partially retarded from hardening. The first and second quantities of sealant are packaged together for delivery to a substrate, such as a fastener.

19 Claims, 3 Drawing Sheets

PREMIXED AND FROZEN SEAL CAPS

Figure 1A:
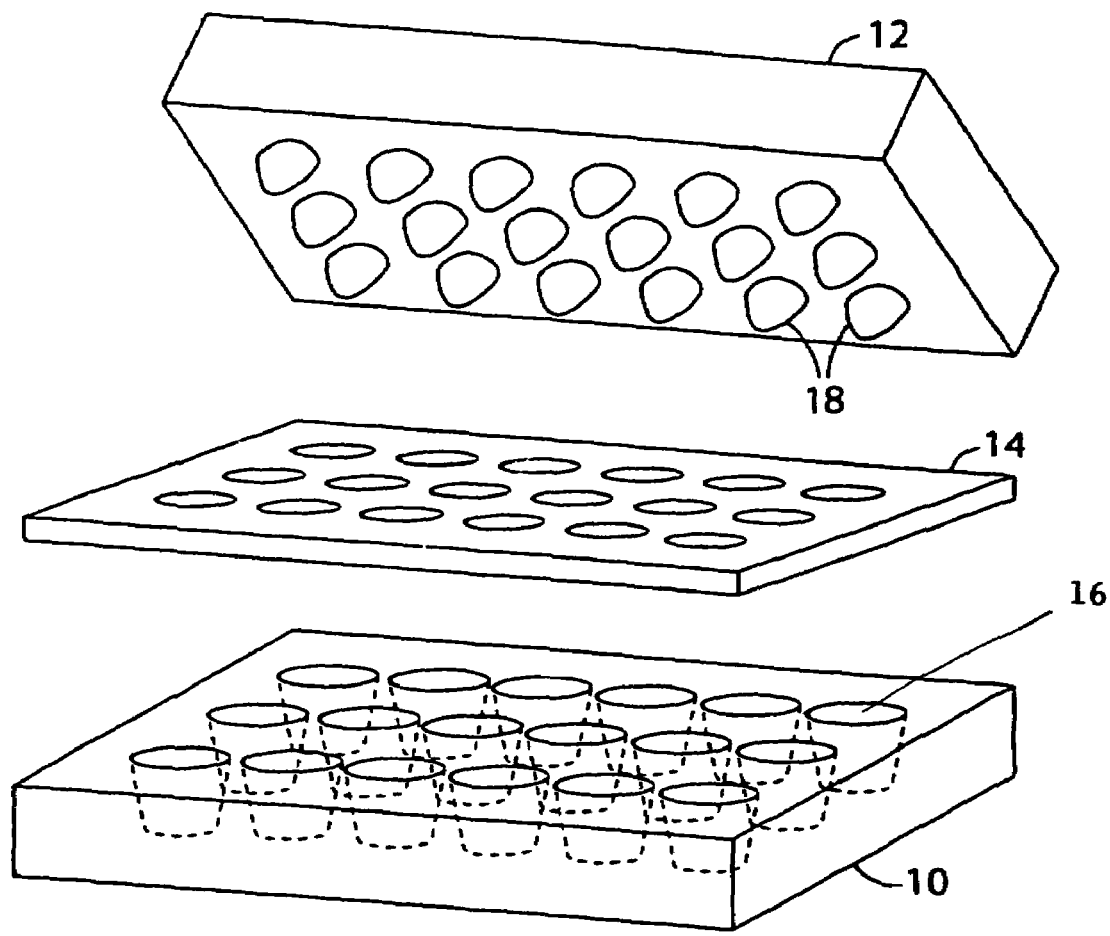

Applicant claims the right to priority under 35 U.S.C. §119(e) based on U.S. Provisional Patent Application No. 60/326,391, entitled "PREMIXED AND FROZEN SEAL CAPS," filed Sep. 28, 2001, and which is expressly incorporated herein by reference in its entirety.

The present invention is related to sealant materials. More particularly, the invention relates to preformed and unhardened sealant shells, methods for making such shells, and methods for applying such shells to substrate.

Dispensing systems for dispensing curable sealants are well known in the art. There are a variety of methods for applying sealant to a fastener using a cap. These methods involve applying the sealant and then shaping it with a cap over the fastener or injecting the sealant into a cap encasing the fastener. These methods require precise metering of the sealant either around the fastener prior to placing the cap around the sealant, or into a cap before placing the cap and sealant over fasteners. These methods are costly and impractical. Moreover, these methods do not provide consistent results.

Preformed sealant caps which are filled with uncured sealant immediately prior to application on the fastener are subject to similar inefficiencies. This extra step of filling the cap with uncured sealant makes application of the sealant on the fastener cumbersome. The typical practice involves applying sealant on many fasteners at one time. The extra step of filling caps complicates the application and adds to the length of time required to apply the sealant on fasteners throughout the substrate. The fact that the sealant cures within a fixed period of time after dispensing complicates dispensing the sealant prior to the application to the fastener.

There is a need, therefore, for a sealant that addresses the inefficiencies and complications of the existing materials.

For the purposes of this specification, unless otherwise indicated, all numbers expressing quantities of ingredients or percentages or proportions of other materials, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certains errors necessarily resulting from the standard deviation found in their respective testing measurements.

A non-limiting embodiment of the present invention comprises a preformed at least partially hardened first quantity of sealant and a preformed at least partially unhardened second quantity of sealant. The first quantity of sealant and the second quantity of sealant comprise the same composition.

In another non-limiting embodiment, a sealant comprises a preformed at least partially hardened first quantity of sealant, and a preformed at least partially unhardened second quantity of sealant, wherein said first quantity of sealant and said second quantity of sealant comprise the same composition. In another non-limiting embodiment, the first quantity of sealant can comprise a concave shell comprising an internal cavity, and the second quantity of sealant can be positioned within said cavity. In a further non-limiting embodiment, the second quantity of sealant can be at a temperature sufficiently below the hardening temperature of the second quantity of sealant, such that the second quantity of sealant is at least partially retarded from hardening.

A non-limiting exemplary process for making an embodiment of sealant of the present invention comprises obtaining the first quantity of sealant and at least partially hardening said first quantity of sealant. The second quantity of sealant is brought into contact with the first quantity of sealant. The second quantity of sealant is maintained at least partially unhardened by thermally regulating it at a temperature sufficiently below its hardening temperature to at least partially retard hardening of said second quantity of sealant.

The non-limiting exemplary process further comprises compressing the first quantity of sealant to a predetermined thickness forming the concave shell with the internal cavity into which the second quantity of sealant is positioned. The first quantity of sealant can be kept at least partially hardened by thermally regulating it. The concave shell can be formed by any means known in the art, for example by using an injection-filled mold or using male and female molds. One skilled in the art knows various methods of forming concave shells into a variety of shapes and sizes to fit a particular application. In one embodiment, the rim of the shell can be molded so that the cavity has a clean edge by a shaping means at the interface of the male and female molds.

In one non-limiting embodiment, the shaping means comprises a material to which the first quantity of sealant adheres such as ethanoate (acetate), butanoate, pentanoate and hexanoate, or other flexible materials to which the sealant adheres. This shaping means removes the excess amount of sealant forming a clean edge for the cavity around the rim of the shell. After the second quantity of sealant is positioned in the cavity the two quantities are packaged together to prevent moisture from contacting the sealant prior to application to the substrate.

In one non-limiting embodiment, the sealant can be kept at temperatures between and including $-100°$ C. and $-25°$ C. to retard hardening. In another embodiment, the sealant can be kept at a minimum of $-75°$ C. In another embodiment, the sealant can be kept at a maximum of $-55°$ C. In another embodiment, the sealant can be kept at a temperature that can be $-45°$ C. When applying the sealant to the substrate, the first and second quantities of sealant can be exposed to temperatures sufficient to at least partially harden the second quantity of sealant.

The accompanying drawings, which are incorporated in and constitute a part of this specification, illustrate some non-limiting embodiments of the invention and together with the description, serve to explain the invention.

Figure 1B:
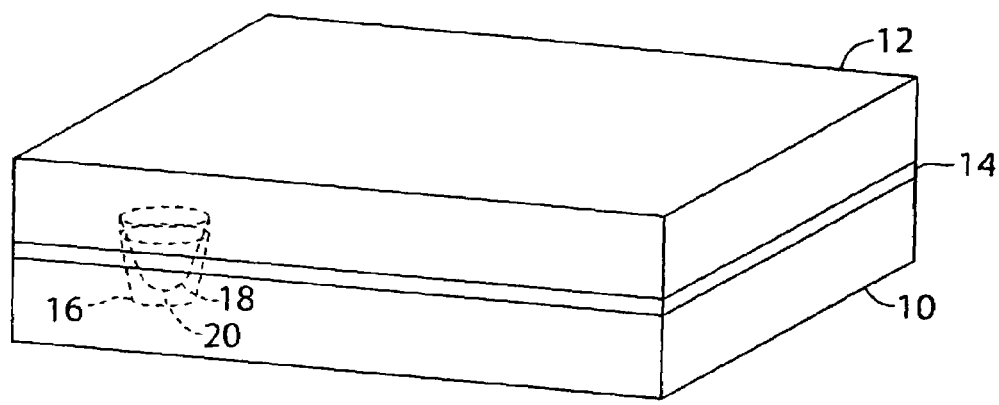
Figure 1C:
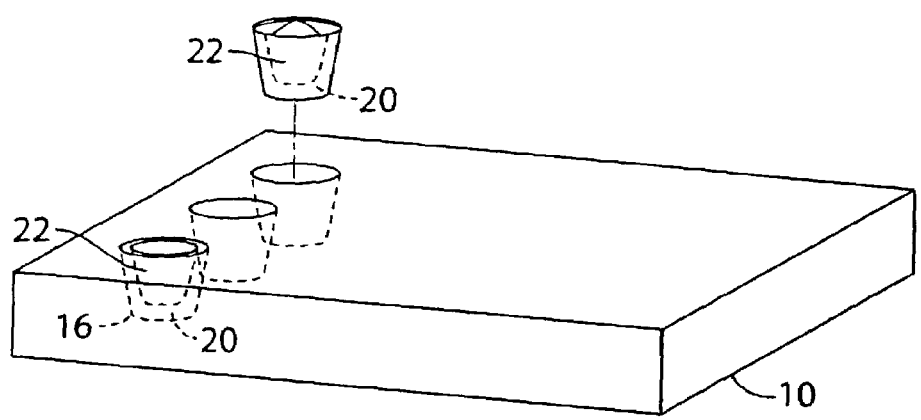

FIGS. 1a-1c illustrate a non-limiting embodiment of the process for making the sealant. FIG. 1a illustrates the male and female molds used to make the sealant. FIG. 1b illustrates the molding of the first quantity of sealant into a shell using the male and female molds. FIG. 1c illustrates the positioning of the second quantity of sealant in the shell.

Figure 2:
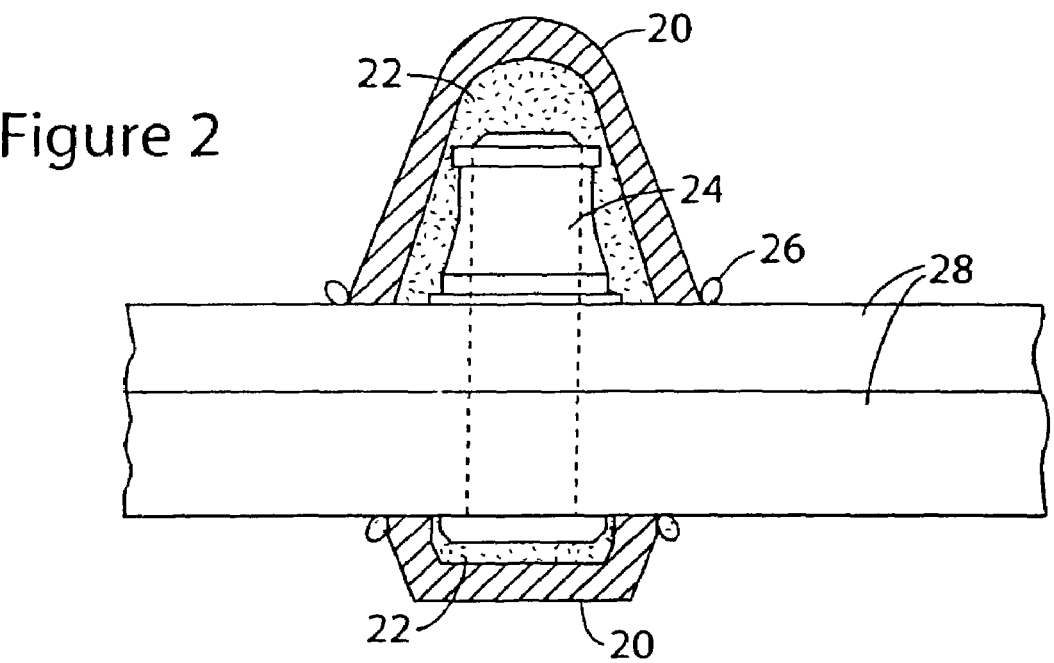
Figure 3:
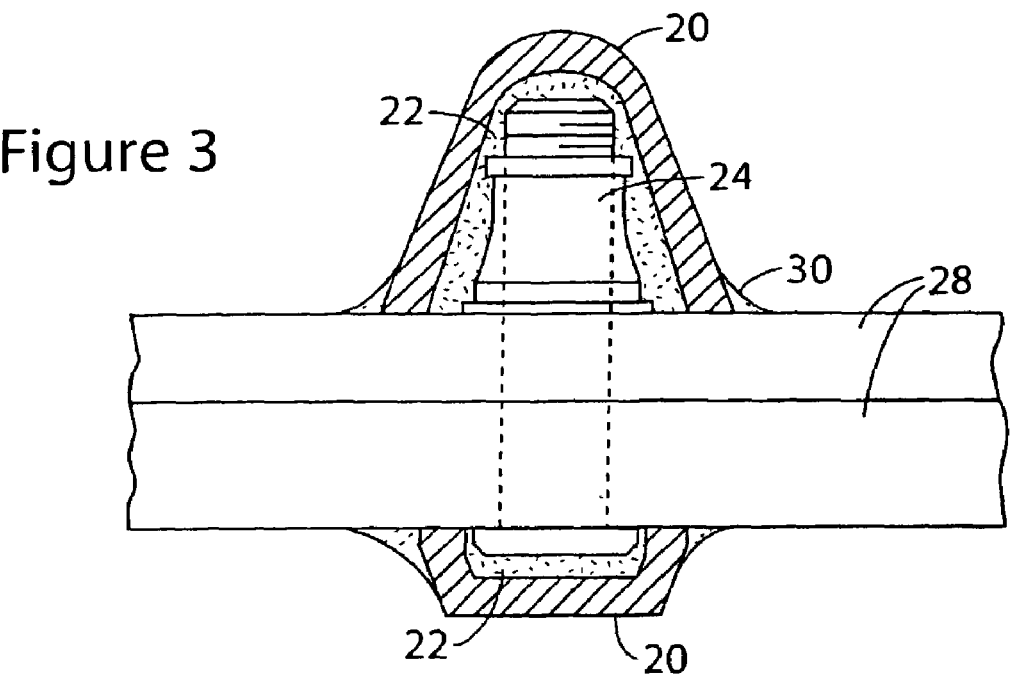

FIG. 2 illustrates the application of an embodiment of the shell to one type of substrate, specifically a rivet fastener. FIG. 3 illustrates the application of the shell to another type of substrate, specifically a nut and bolt fastener.

Wherever possible, the same reference numbers will be used throughout the Figures to refer to the same or like parts. FIG. 1a illustrates an embodiment of the male and female molds. The female mold (10) contains several compartments

(16) for molding the external surface of the first quantity of sealant. The compartments (16) can be of similar or different size and shape depending on the variety of shells necessary for the application. The number of compartments (16) can vary on the number of shells needed, size of racks in temperature controlled environment, ease of transport, and size of machinery for dispensing the sealant. The male mold (12) contains protrusions (18) which align with the compartments of the female mold (10).

A non-limiting embodiment of the molds can be constructed of a strong composite material that is adapted to release from the sealant so that the partially hardened shell can be removed once the second quantity of sealant has been positioned in the internal cavity. In an alternate non-limiting embodiment, the injection-filled mold can comprise male and female molds bound together. The first quantity of sealant is injected through openings in the mold into the gap between the male and female mold. The first quantity of sealant is partially hardened into shells of predetermined thickness. The male and female molds are unbound to free the shells and allow for the positioning of the second quantity of sealant in the internal cavity.

In another non-limiting embodiment a film or gasket (14) is placed between the male (12) and female (10) molds. The film can be made of any suitable material, for example ethanoate (acetate) or comparable material such as butanoate, pentanoate and hexanoate, or other flexible materials to which the sealant adheres. Generally the film (14) is perforated so that the perforations correspond to the protrusions (18) on the male mold (12) and the compartments (16) on the female mold (14). The film can also contain locating pins (not shown) which allow for the film (14) to easily be aligned with the compartments (16) of the female mold (10) and to keep the film (14) from shifting while pressing the two molds together to compress the first quantity of sealant. Other means known in the art can also be used to accomplish the result of obtaining a smooth edge to the sealant cap.

In alternate non-limiting embodiments, the film (14) can be replaced by any means which removes the excess amount of the first quantity of sealant around the rim of the shell, creating an essentially clean edge for the internal cavity. Such means can comprise of any chemical, mechanical, or electrical system configured to remove the excess sealant either during or after the two molds have been pressed together.

FIG. 1b illustrates a non-limiting embodiment of molding the first quantity of sealant into a shell using the male and female molds. The first quantity of sealant (20) has been dispensed into the compartments (16) of the female mold (10). The first quantity of sealant fills the gap between the protrusions (18) of the male mold (12) and the compartments (16) of the female mold (12). This gap has a predetermined thickness which corresponds to the minimum thickness of the sealant desired on the substrate. The two molds are pressed together to compress the first quantity of sealant and displace an amount of excess sealant which adheres to film (14). The molds are held together for a sufficient length of time to allow the first quantity of sealant (20) to at least partially harden.

In one non-limiting embodiment, the first quantity of sealant (20) can be allowed to at least partially harden throughout, or "cure" to completion. The term "at least partially hardened" is meant to include the entire range of hardness from completely cured to somewhat gelled at least to the point that the first quantity of sealant can be manually or mechanically handled for application to the substrate. Conversely, the term "at least partially unhardened" is meant to include the entire range of hardness from completely liquid to somewhat gelled at least to the point that the second quantity of sealant can conform to the surface of the substrate. Therefore, it is contemplated that portions of sealant can be hardened or unhardened such that the sealant is not uniform throughout the quantity of the sealant. For example, sealant does not have to all harden at the same time, and can leave the potential for pockets of unhardened sealant in almost completely cured sealant and hardened sealant in almost completely uncured sealant.

The hardening or curing time for sealant depends on the pot life of the sealant composition and can vary widely ranging from minutes to hours. In another non-limiting embodiment, the first quantity of sealant can be thermally regulated to keep it from becoming completely cured prior to positioning the second quantity of sealant in the internal cavity.

FIG. 1c illustrates a non-limiting example showing the positioning of the second quantity of sealant in the shell. The male mold (12) and film (14) with excess sealant have been removed leaving the first quantity of sealant (20) in compartments (16) in the shape of a concave shell with an internal cavity. The second quantity of sealant (22) is positioned in the cavity of the first quantity of sealant (20). The combination of preformed first quantity (20) and preformed second quantity (22) of sealant is thermally regulated until application to the substrate. The term "preformed" refers to the dispensing and packaging of the quantity of sealant such that the sealant can be stored and transported prior to its application to the substrate.

In one non-limiting embodiment, a sufficient quantity of sealant can be used to fill the shells to just above the surface of the compartments. Release paper or other similar material well known to those skilled in the art can then be applied over the sealant. This packaging at least partially inhibits moisture from developing when the sealant is thermally regulated during storage and transportation, and as the temperature of the sealant increases prior to application. If moisture is allowed to collect on the sealant it can become lodged between the substrate and sealant during application detrimentally affecting the performance of the sealant. In the non-limiting embodiment where sealant is stored and shipped in the female mold, the thermal properties of the material used to construct the mold are chosen to reduce the potential for condensation such as hydrophobic polymers.

In one non-limiting embodiment, the preformed sealant shell and at least partially unhardened sealant can be applied directly to the substrate without dispensing the sealant immediately prior to the application (the immediacy can vary widely and is determined by the pot life of the sealant). The first quantity and second quantity of sealant comprise the same composition. In one further non-limiting embodiment, once the at least partially unhardened second quantity of sealant has cured it becomes generally uniform with the at least partially hardened first quantity such that the interface between the first and second quantities of sealant can becomes at least partially obscured.

The term "thermally regulating" refers to decreasing and/or maintaining the second quantity of sealant (and first quantity of sealant if unhardened) at temperatures that retard hardening by at least partially suspending the curing process. Temperature can be decreased to effectively suspend the curing process. In one non-limiting embodiment, the length of time for the curing process to reach completion can correlate inversely with temperature, such that the lower the temperature the greater the suspension in the curing process and rate of retardation of hardening. In one non-limiting embodiment, the decrease and/or maintenance of the temperature can last from the point in time when the second quantity of sealant is made and positioned in the concave shell of the first quantity of sealant to the point when the sealant is ready for application to the substrate. Hence, cooling is used during storage and transport of the sealant, such as shipping the sealant under refrigerated conditions or in dry ice.

The temperature to suspend the curing process referred above can vary widely and depends on the shelf life of the sealant. The date of expiration for sealant relative to temperature varies from sealant composition to sealant composition. In one non-limiting example, the shelf life of a sealant can be 21 days at −40° C. The shelf life can be extended by lowering the temperature. In one non-limiting embodiment, the sealant can be kept at temperatures between and including −100° C. to −25° C. to retard hardening. In another non-limiting embodiment, the sealant can be kept at a maximum temperature of −75° C. In another non-limiting embodiment, the sealant can be kept at a minimum temperature of −55° C. In another non-limiting embodiment, the sealant can be kept at −45° C. The choice of sealant is not critical and a variety of materials known in the art can be used. The particular choice of sealant generally depends on a number of factors such as the type of substrate and intended end use. Non-limiting examples of commercially available sealants include PR-1776®, PS-890® and PR-1440® from PRC DeSoto International, Inc. (Burbank, Calif.) and AC-236® and AC-250® from AC Tech (PBT Brands, Inc., Hartford Conn.).

In the non-limiting embodiments listed above, the sealant can be at cured or hardened by the addition of heat. In another non-limiting embodiment, the second quantity of sealant can be cured or hardened by oxidation. In this embodiment, the oxidation of the second quantity of sealant can be retarded by limiting the sealant's exposure to air such that the sealant remains partially unhardened.

The term "inhibiting" refers to restraining, impeding, slowing or interfering with a particular reaction or function. This can be accomplished in a number of ways, for example, controlling the environment to which the sealant is exposed. In the case of oxidation, inhibiting refers to restraining, impeding, slowing or interfering with the oxidation of the sealant. In a non-limiting example, oxidation is at least partially inhibited by limiting the sealant's exposure to air or ambient conditions. In the case of the moisture, inhibiting refers to restraining, impeding, slowing or interfering with the development of moisture on the sealant. A non-limiting example comprises at least partially inhibiting moisture by limiting the condensation on the sealant surface.

A variety of sealant compositions can be preformed in such a fashion. As was mentioned above, the choice of sealant is not critical and a wide variety of known sealants can be used including PR-1776®, PS-890® and PR-1440® from PRC DeSoto International, Inc. (Burbank, Calif.) and AC-236® and AC-250® from AC Tech (PBT Brands, Inc., Hartford Conn.). In addition, this method of preformed concave shells and preformed at least partially unhardened material can be used for other compositions such as adhesives, coatings, etc.

A non-limiting embodiment for a method of making the sealant comprises the steps outlined in FIGS. 1a through 1c of obtaining a first quantity of sealant, at least partially hardening it, contacting it with a second quantity of sealant and maintaining the second quantity at least partially unhardened. A non-limiting embodiment for a method for applying the sealant to the substrate comprises obtaining the preformed second quantity of sealant at a temperature sufficient to retard hardening, exposing it to a temperature sufficient to at least partially harden the sealant, and contacting the sealant with the substrate. Such a temperature can comprise thermally regulating the sealant to increase the temperature gradually or allowing the sealant to reach ambient temperature (20° C.).

Another non-limiting embodiment, for a method of applying the sealant comprises obtaining a preformed second quantity of sealant in conditions sufficient to retard oxidation, exposing it to air sufficient to oxidize the second quantity of sealant to an at least partially hardened state.

The are many examples of substrates, such as convex, arcuate, or flat surfaces that utilize sealants. A non-limiting embodiment of a convex substrate is a fastener. FIGS. 2 and 3 illustrate two examples of fasteners sealed using the preformed first and second quantities of sealant. The plates (28) are fastened by fastener (24) (a rivet in FIG. 2 and a nut and bolt in FIG. 3). The concave shell comprising the first quantity of sealant (20) is pressed and twisted over the fastener (24) to completely envelope the fastener. Both sides of the fastener (24) can be sealed using concave shells of first quantity of sealant (20) having different size and shape. The fastener (24) is coated by the second quantity of sealant (22). The fastener (24) displaces a portion (26) of the second quantity of sealant. This excess portion (26) ensures a tight seal between the first quantity of sealant (20) and the plates (28). The excess portion can be left whole as in FIG. 2 or smoothed over to make a smooth transition (30) between the first quantity of sealant (20) and the plates (28) as in FIG. 3.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A sealant comprising:
   a preformed at least partially hardened first quantity of sealant; and
   a preformed at least partially unhardened second quantity of sealant, wherein said first quantity of sealant and said second quantity of sealant comprise the same composition; wherein
   said second quantity of sealant is at a temperature sufficiently below the hardening temperature of said second quantity of sealant, such that said second quantity of sealant is at least partially retarded from hardening.

2. A sealant according to claim 1, wherein:
   said first quantity of sealant and said second quantity of sealant are packaged together for delivery to a substrate.

3. A sealant according to claim 2, wherein:
   said substrate comprises a fastener.

4. A sealant comprising:
   a preformed at least partially hardened first quantity of sealant; and
   a preformed at least partially unhardened second quantity of sealant, wherein said first quantity of sealant and said second quantity of sealant comprise the same composition; wherein
   said second quantity of sealant is inhibited from oxidizing, such that said second quantity of sealant is at least partially retarded from hardening.

5. A method for making a sealant comprising:
   obtaining a first quantity of sealant;
   at least partially hardening said first quantity of sealant;
   contacting a second quantity of sealant with said first quantity of sealant;
   maintaining said second quantity of sealant at least partially unhardened; and
   maintaining said second quantity of sealant at least partially unhardened further comprises thermally regulating said second quantity of sealant at a temperature sufficiently below its hardening temperature to at least partially retard hardening of said second quantity of sealant.

6. A method for making a sealant according to claim 5, further comprising:
packaging said sealant to at least partially inhibit moisture from contacting said first quantity and said second quantity of sealant.

7. A method for making a sealant according to claim 5, wherein:
said temperature has a minimum of −75° C.

8. A method for making a sealant according to claim 5, wherein:
said temperature has a maximum of −55° C.

9. A method for making a sealant according to claim 5, wherein:
said temperature is approximately −45° C.

10. A method for making a sealant according to claim 5, wherein:
said temperature ranges from −100° C. to −25° C.

11. A method for making a sealant according to claim 5, wherein:
at least partially hardening said first quantity of sealant further comprises compressing said first quantity of sealant to a predetermined thickness.

12. A method for making a sealant according to claim 10, wherein:
compressing said first quantity of sealant further comprises forming said first quantity of sealant into a concave shell having an internal cavity; and
contacting said second quantity of sealant further comprises positioning said second quantity of sealant into said cavity.

13. A method for making a sealant according to claim 12, wherein:
forming said concave shell further comprises using male and female molds.

14. A method for making a sealant according to claim 13, wherein:
forming said concave shell further comprises shaping the shell at the interface between the male and female molds.

15. A method for making a sealant according to claim 14, wherein:
said means removes an excess amount of said first quantity of sealant forming a clean edge for said cavity.

16. A method for making a sealant according to claim 13, wherein:
forming said concave shell further comprises placing a film between the male and female molds, said film comprising at least one component chosen from ethanoate, butanoate, pentanoate, hexanoate, and other flexible materials to which said sealant adheres.

17. A method for making a sealant comprising:
obtaining a first quantity of sealant;
at least partially hardening said first quantity of sealant;
contacting a second quantity of sealant with said first quantity of sealant;
maintaining said second quantity of sealant at least partially unhardened; and
maintaining said second quantity of sealant at least partially unhardened further comprises inhibiting said second quantity of sealant from oxidizing to at least partially retard hardening of said second quantity of sealant.

18. A method for making a sealant according to claim 12, wherein:
said concave shell is formed by molding, said molding comprising using an injection-filled mold.

19. A method for making sealant comprising:
forming a concave shell of a first quantity of sealant using male and female molds;
placing a film between said male and female molds, said film comprising at least one material chose from ethanoate, butanoate, pentanoate, hexanoate, and other flexible materials to which said sealant adheres;
at least partially hardening said first quantity of sealant;
removing said film and an excess amount of said first quantity of sealant that contacts said film;
at least partially filling said concave shell with a second quantity of sealant;
thermally regulating said second quantity of sealant at a temperature sufficiently below its hardening temperature to at least partially retard hardening of the second quantity of sealant; and
packaging said sealant to at least partially inhibit moisture from contacting said second quantity of sealant.

* * * * *